United States Patent
Pons et al.

(10) Patent No.: US 8,830,893 B2
(45) Date of Patent: Sep. 9, 2014

(54) MANAGEMENT OF NETWORK LAYER PACKETS IN AN ACCESS NETWORK OF A TELECOMMUNICATIONS NETWORK

(75) Inventors: Jerome Pons, Paris (FR); Philippe Herbelin, Vincennes (FR)

(73) Assignee: Orange, Paris (FR)

( * ) Notice: Subject to any disclaimer, the term of this patent is extended or adjusted under 35 U.S.C. 154(b) by 346 days.

(21) Appl. No.: 12/665,109

(22) PCT Filed: Jun. 12, 2008

(86) PCT No.: PCT/FR2008/051054
§ 371 (c)(1),
(2), (4) Date: Apr. 27, 2010

(87) PCT Pub. No.: WO2009/004223
PCT Pub. Date: Jan. 8, 2009

(65) Prior Publication Data
US 2010/0202330 A1    Aug. 12, 2010

(30) Foreign Application Priority Data
Jun. 18, 2007  (FR) ..................... 07 55829

(51) Int. Cl.
| | |
|---|---|
| *H04H 20/71* | (2008.01) |
| *H04W 4/00* | (2009.01) |
| *H04L 12/66* | (2006.01) |
| *H04L 29/08* | (2006.01) |
| *H04L 12/56* | (2006.01) |
| *H04W 8/26* | (2009.01) |
| *H04L 29/06* | (2006.01) |
| *H04W 40/12* | (2009.01) |
| *H04W 88/10* | (2009.01) |

(52) U.S. Cl.
CPC .................. *H04L 45/38* (2013.01); *H04W 8/26* (2013.01); *H04L 69/325* (2013.01); *H04L 69/22* (2013.01); *H04W 40/12* (2013.01); *H04W 88/10* (2013.01)
USPC ............................ 370/312; 370/328; 370/352

(58) Field of Classification Search
None
See application file for complete search history.

(56) References Cited

U.S. PATENT DOCUMENTS

| | | | |
|---|---|---|---|
| 2006/0018283 A1* | 1/2006 | Lewis et al. ................... | 370/331 |
| 2006/0221933 A1* | 10/2006 | Bauer et al. ................... | 370/352 |
| 2007/0117563 A1* | 5/2007 | Terry et al. .................... | 455/434 |
| 2010/0093345 A1* | 4/2010 | Verhoef et al. ................ | 455/433 |

FOREIGN PATENT DOCUMENTS

| | | |
|---|---|---|
| WO | 2004003690 | 1/2004 |
| WO | 2006118489 | 11/2006 |

* cited by examiner

*Primary Examiner* — Faruk Hamza
*Assistant Examiner* — Diane Lo
(74) *Attorney, Agent, or Firm* — Knobbe Martens Olson & Bear LLP (57) ABSTRACT

An access node such as a base station is adapted to communicate with a first transmission network and via a data radio channel with a user node. When a second transmission network is connected to the access node, to manage a network layer packet transmitted between the user node and a node of one of the first and second transmission networks, the access node inspects at least one part of the network layer packet, and switches the inspected network layer packet to a node of one of the first and second transmission network or to the user node.

13 Claims, 4 Drawing Sheets

MANAGEMENT OF NETWORK LAYER PACKETS IN AN ACCESS NETWORK OF A TELECOMMUNICATIONS NETWORK

RELATED APPLICATIONS

The present application is based on, and claims priority from, French Application Number 0755829, filed Jun. 18, 2007, and PCT Application Number PCT/FR08/051054, filed Jun. 12, 2008, the disclosures of which are hereby incorporated by reference herein in their entirety.

The present invention relates to the management of network layer packets in an access network of a telecommunications network in order to redirect a network layer packet to a first transmission network or to a second local transmission network.

The invention is in keeping with the telecommunications field and more particularly with the cell radio networks for mobiles, in case the access network has access to two transmission networks such as a core network for mobiles, for instance of the telecommunications network type UMTS ("Universal Mobile Telecommunications System"), a so-called conventional transmission network, and such as a local home or business network.

Figure 1:
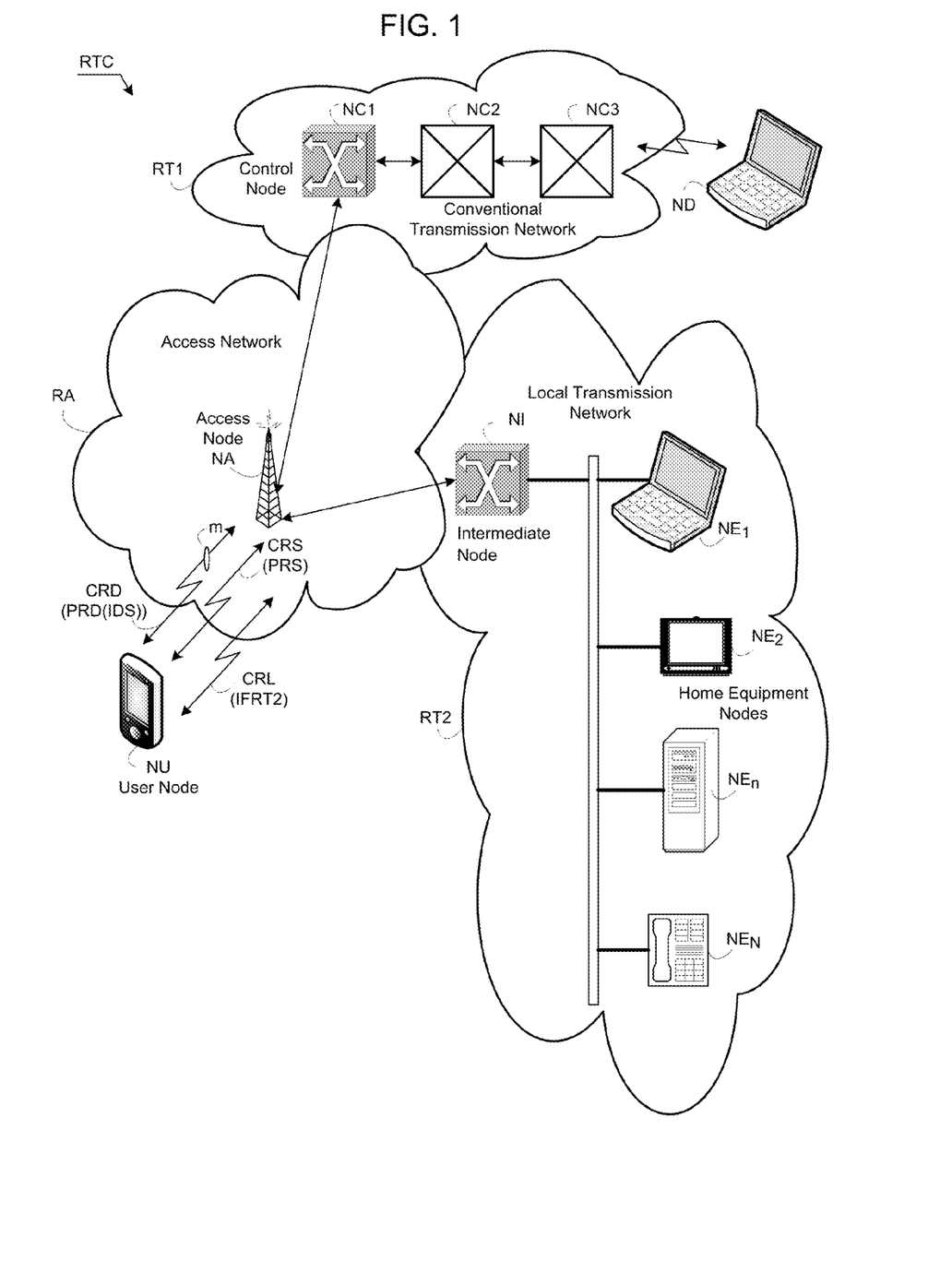
FIG. 1 is a schematic block diagram of a telecommunications network according to the invention.

Referring to a part of FIG. 1, a known telecommunications network architecture includes a first user node NU, such as a mobile terminal or a communicating personal digital assistant, in communication with a destination node ND, such as a second mobile terminal or a server in an external network, through a radio access telecommunications network RTC including an access network RA and a conventional transmission network RT1. The access network RA includes at least one access node NA constituting an access point. The conventional transmission network RT1 includes at least one control node NC1, constituting a control point, a control point concentrator NC2 and an access node NC3 having access to an external network including the destination node ND.

According to the ISO (International Organization for Standardization) model, the nodes of the telecommunications network RTC possess hierarchical protocol layers in different numbers. The user node NU possesses the seven protocol layers of the ISO model that are successively: a physical layer, a data link layer, a network layer, a transport layer, a session layer, a presentation layer and an application layer. The access node NA of the access network RA possesses successively the physical layer and the data link layer. The nodes NC1, NC2 and NC3 of the conventional transmission network RT1 possess each one and successively a physical layer, a data link layer and a network layer. The destination node ND of the external network possesses successively a physical layer, a data link layer, a network layer, a transport layer, a session layer, a presentation layer and an application layer.

According to the known Pre-Release 8 UMTS architecture, the access network RA corresponds to the UTRAN ("Universal Terrestrial Radio Access Network") network including at least one base station Node B associated with a base station controller RNC ("Radio Network Controller") in the access node NA. The conventional transmission network RT1 corresponds to the core network UMTS including at least one gateway SGSN ("Serving GPRS Support Node") corresponding to the control node NC1 and a gateway GGSN ("Gateway GPRS Support Node") corresponding to the combined nodes NC2 and NC3 and controlling multiple gateways SGSN and serving as an access point for an external network via the routing function thereof.

According to the Release 8 UMTS cellular radio network architecture, also known by specification works LTE/SAE ("Long Term Evolution/System Architecture Evolution"), the access node NA of the access network RA constitutes an evolved node eNB, the control node NC1 of the conventional transmission network RT1 corresponds to the serving gateway SGW and the nodes NC2 and NC3 form a gateway PGW (for "PDN Gateway", "Packet Data Network").

According to the Home Gateway Initiative architecture HGI, the access node NA corresponds to an access point WLAN ("Wireless Local Area Network"), the control node NC1 corresponds to a HGI router, and the nodes NC2 and NC3 correspond to a multi-service line multiplexer DSLAM ("Digital Subscriber Line Access Multiplexer") and an internet access server BRAS ("Broadband Remote Access Server").

These architectures do not allow inside the access node NA of the access network RA the switching or the routing of network layer packets from the node NU to a local transmission network of home network or business network type. The network layer packets are always transmitted between the node NU and the node NC1 of the conventional transmission network RT1 of a radio communications network operator for mobiles for instance, via the node NA. As previously indicated, the access node NA does not possess any network layer and is unable to process network layer packets transmitted between the user node NU and the control node NC1. The access node NA serves as an access relay and does not act as a packet processing unit. The network layer packets exchanged between the user node NU and the control node NC1 are exchanged as frames encapsulating the packets and can be transmitted as an encrypted form which makes it impossible to access "in clear" to these packets and to inspect their contents by the access node NA.

Furthermore, the telecommunications network RTC is hierarchical. When the user node NU wants to communicate with the destination node ND of the external network, it has first to communicate with many intermediate nodes NA, NC1, NC2 and NC3, the data transmission rate of which between the different nodes varies. The radio transmission channel linking the node NU with the node NA presents a low data transmission rate. Nevertheless the transmission channels linking the other nodes NC1, NC2, NC3 and ND have higher data transmission rates. The multilevel and rate variation stress hinders a rate increase in the telecommunications network. No switching or routing of the network layer packets provided by the user node NU to another transmission network with a higher rate is possible in the access node NA since this latter does not access to the network layer. Furthermore, the high rate within the conventional transmission network of UMTS network type has a higher cost than in a local transmission network.

In order to overcome the above-described drawbacks, a method according to the invention of managing a network layer packet in an access node communicating with a first transmission network and communicating via a data radio channel with a user node is characterized in that, the access node being connected to a second transmission network, the method includes:

inspecting at least one part of the network layer packet, and
switching the inspected network layer packet to a node of one of the first and second transmission network or to the user node.

The method embodying the invention advantageously manages network layer packets from an access node, such as an access point of an access network, within a transmission network in order to redirect, i.e. to switch or route, the network layer packets towards one of the transmission networks. The prior techniques do not allow transmission of network layer packets between a user node and a single conventional transmission network such as the core network of a UMTS network.

Previously to inspecting the network layer packet in the access node upon the installation of the second network, the method can include detecting a connection to the second transmission network and transmitting information relative to the second transmission network towards the user node. This information can be transmitted from the access node to the user node via a local radio channel unknown by the first transmission network and established by the access node or through a conventional signaling radio channel known by the first transmission network and established by the access node.

In order to transmit a network layer packet relative to a service dispensed by an equipment node of the second transmission network from the access node to the user node, the method can include negotiating between the access node and a node of the first transmission network to establish a data radio channel, supporting the packet related to the service, between the user node and the access node.

According to another embodiment, between inspecting and switching a network layer packet relative to a service dispensed by an equipment node of the second transmission network, the method can include requesting negotiation from the access node to the user node, the negotiation being done between the user node and a node of the first transmission network in order to establish a data radio channel, and transmitting the network layer packet relative to the dispensed service from the access node to the user node through the established data radio channel.

The negotiation can depend on one or more service quality criteria relative to the service dispensed by the equipment node that the data radio channel to be established has to meet.

According to yet another embodiment, between inspecting and switching a network layer packet relative to a service dispensed by an equipment node of the second transmission network, the method can include selecting a data radio channel pre-established by the access node for a preceding communication between the user node and a node of one of the first and second transmission networks, and transmitting the network layer packet relative to the dispensed service from the access node to the user node through the selected data radio channel.

Another object of the invention is to provide an access node for managing a network layer packet, the access node being adapted to communicate with a first transmission network and via a data radio channel with a user node. The access node is characterized in that it includes:

means adapted to be connected to a second transmission network, means for inspecting at least one part of the network layer packet, and means for switching the inspected network layer packet to a node of one of the first and second transmission network or to the user node.

According to embodiments of the access node according to the invention, the latter can include means for negotiating between the access node and a node of the first transmission network the establishment of a data radio channel, means for requesting to the user node a negotiation with a node of the first transmission network in order to establish a data radio channel, means for selecting a data radio channel pre-established by the access node for a preceding communication between the user node and a node of one of the first and second transmission networks, and means for transmitting a network layer packet relative to the service dispensed by an equipment node of the second transmission network, from the access node to the user node through the selected data radio channel.

The invention relates to also a computer program adapted to be performed in an access node embodying the invention and communicating with a first transmission network and via a data radio channel with a user node, for managing a network layer packet, said program including instructions which, when the program is executed in said access node, perform the steps according to the method of the invention.

Other features and advantages of the present invention will become more clearly apparent from reading the following description of several embodiments of the invention, given by way of nonlimiting examples, with reference to the corresponding appended drawings in which.

The invention relates to a telecommunications network RTC such as previously described and shown on FIG. 1. The network RTC according to the invention includes, further to the access network RA and the first conventional transmission network RT1 of a radio communication operator for mobiles for instance, a local transmission network RT2, such as a home network of the "Home LAN" ("Local Area Network") type or a business network of the "Corporate LAN" type, including N home equipment nodes $NE_1$ to $NE_N$ communicating with the access node NA of the access network RA. The local transmission network RT2 also includes an intermediate node NI serving as a gateway relaying packet exchanges between the access node NA and at least one $NE_n$ of the equipment nodes, with $1 \leq n \leq N$.

Alternatively, the intermediate node NI is cancelled.

According to another alternative, the intermediate node NI and the control node NC1 are merged but maintain their respective functions.

The home equipment nodes $NE_1$ to $NE_N$ are for instance, a personal computer $NE_1$, a digital television $NE_2$, a proprietary multicast server $NE_n$ as a server diffusing television programs, a fixed telephone $NE_N$, and any other digital device adapted to communicate with the access node NA via the local transmission network RT2.

The nodes NA and NU exchange network layer packets between them via two types of distinct conventional radio channels: a conventional signaling radio channel CRS to exchange signaling packets PRS, and one or m data conventional radio channels CRD to exchange service data packets PRD. These conventional radio channels are established and allocated by the access node NA to the user node NU and can be approved by the control node NC1 of the conventional transmission network RT1. The signaling channel CRS is established upon the attachment of the user node NU to the access node NA and the signaling of this attachment to the control node NC1. The signaling packets PRS contain control information for the telecommunications network RTC and comprise for instance requests, responses and acknowledgements including sometimes informative data, in order for instance to establish and allocate service data radio channels CRD.

A data channel CRD is established in order to transmit a service between a user node NU and a node ND of the transmission network RT1 or a node $NE_n$ of the transmission network RT2. The quality of service for each data channel CRD corresponds to quality criteria for the service dispensed by the node ND or $NE_n$. The service data packets PRD include for instance text and/or audio and/or video data relative to services dispensed by the server nodes ND of the conventional network RT1 or the equipment nodes $NE_n$ of the local transmission network RT2. The data packets PRD can contain for instance a service request including an identifier IDS of the requested service or a response including the requested service.

Figure 3:
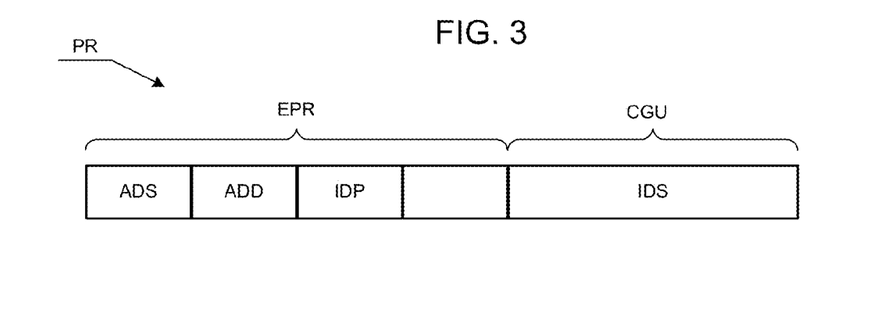
FIG. 3 is a schema representative of fields of a network layer packet inspected and switched/routed by an access node according to the invention.

As shown in FIG. 3, a network layer packet PR, such as a signaling packet PRS or a data packet PRD, includes network header fields EPR and a payload field CGU including useful data. The network header field data EPR are at least one source address ADS, one destination address ADD and one protocol identifier IDP indicating the nature of the protocol relative to the data of the payload CGU. The header EPR and the payload CGU can also include data concerning the upper layers of the ISO model which are the transport layer, the session layer, the presentation layer and the application layer.

The useful data included in the payload CGU of a data packet PRD are in particular service requests containing a service identifier IDS or responses including the requested service. According to an example, the useful data includes a specific television program request including a program identifier as a multicast address. The protocol identifier IDP relative to this type of service corresponds to the protocol IGMP ("Internet Group Management Protocol").

The useful data included in the payload CGU of a signaling packet PRS relates for instance to a negotiation between the access node NA or the user node NU and the control node NC1 to establish a service data radio channel between the nodes NA and NU.

A last local radio channel CRL is established by the access node NA between the nodes NA and NU, and is unknown from the control node NC1. Through the channel CRL, the node NA transmits network layer information IFRT2 concerning the local transmission network RT2 to the node NU. This information IFRT2 includes among others a network address of the access node NA, a network address of the intermediate node NI and a sub-network mask associated with the network RT2 and representative of an addressing plan of the equipment nodes $NE_1$ to $NE_N$ in the network RT2.

Alternatively, the conventional signaling radio channel CRS can also be used to transmit the information IFRT2 concerning the local transmission network RT2 from the node NA to the node NU.

Figure 2:
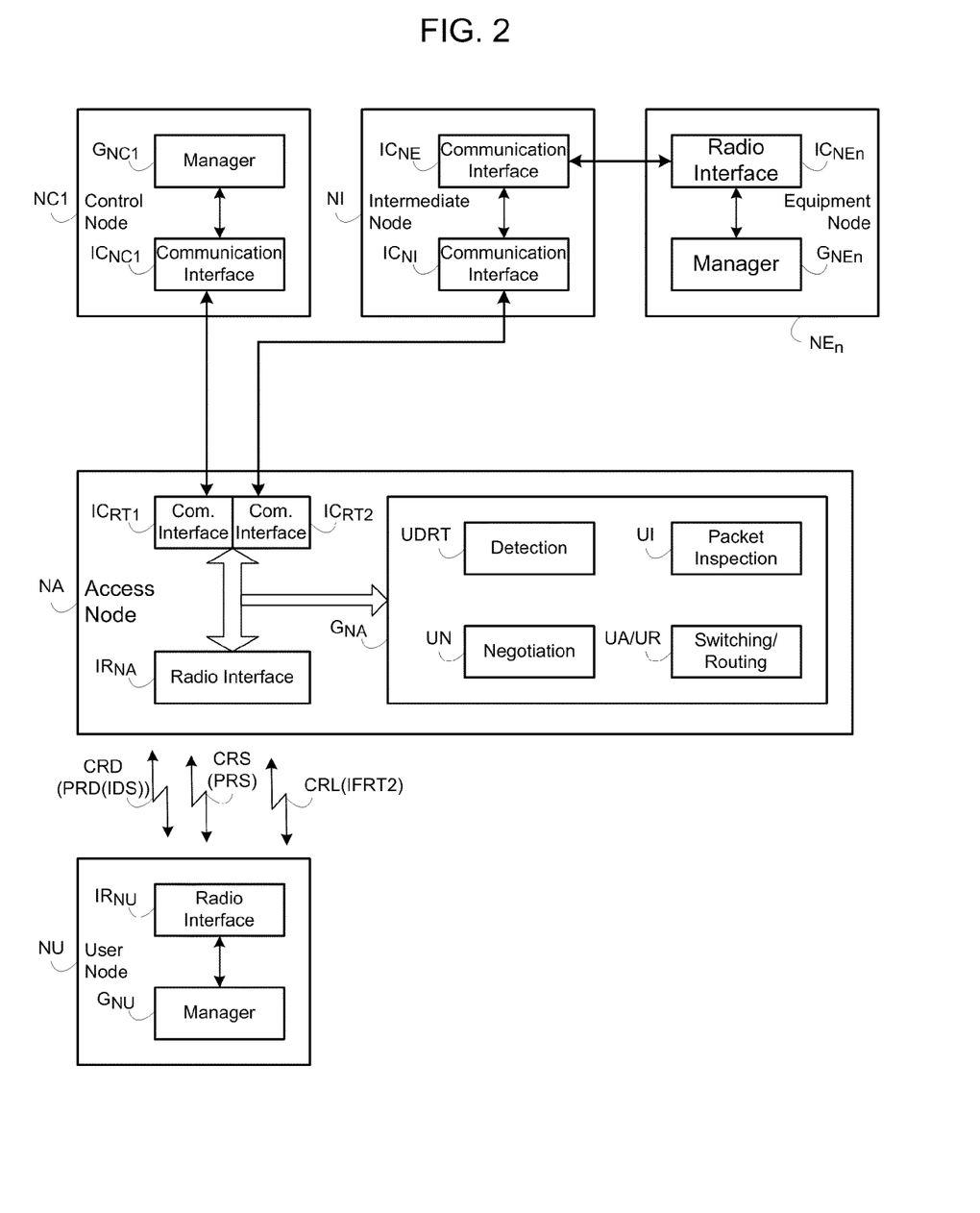
FIG. 2 is a more detailed schematic block diagram of the telecommunications network.

Each one of the nodes NU, NA, NC1, NI, and $NE_n$ of the telecommunications network RTC according to the invention is represented on FIG. 2 as functional blocks most of which provide functions relating to the invention and can correspond to software modules implemented in at least one processor and/or to dedicated or programmable hardware modules within the node.

The user node NU is for instance a communicating personal digital assistant PDA adapted to communicate with an access network of a telecommunications network of the UMTS type. According to other embodiments, the user node NU includes all the functionalities of a mobile radio terminal and is of the smartphone telephone type or personal computer type able to communicate with a telecommunications network of the UMTS type. The user node NU includes among others a radio interface $IR_{NU}$ to communicate with the access node NA of the access network via one of the radio channels CRS, CRD and CRL, and a manager $G_{NU}$ to process, on one hand, communications based on network layer packets PRD and PRS and the information IFRT2 with the node NA and, on the other hand, applications specific to the user node.

The control node NC1 of the conventional transmission network RT1 can include a packet-based communication interface $IC_{NC1}$ to transmit and receive network layer packets to and from the access node NA. The control node NC1 can also include a manager $G_{NC1}$ to process network layer packets transmitted from the access node NA or another node of conventional transmission network RT1 or to be transmitted to them in order, for instance, to obtain the first services required by the node NU and dispensed by server nodes of the network RT1 or nodes ND of an external network linked to the network RT1. The manager $G_{NC1}$ can negotiate with the access node NA or the user node NU to establish the radio channels CRS and CRD.

According to a first alternative, the transmission and the reception of network layer packets to and from the access node NA are provided by one of the other nodes NC2 and NC3. According to a second alternative, the access node NA fulfils itself the establishment of the radio channels.

The intermediate node NI of the local transmission network RT2 is a communication gateway and includes among others a packet-based communication interface $IC_{NI}$ to transmit and receive network layer packets to and from the access node NA, and a communication interface $IC_{NE}$ to transmit and receive network layer packets to and from at least one of the equipment nodes $NE_n$ of the local transmission network RT2.

An equipment node $NE_n$ of the local transmission network RT2 includes at least one packet-based communication interface $IC_{NEn}$ to transmit and receive network layer packets to and from the packet-based communication interface $IC_{NE}$ of the intermediate node NI, and a manager $G_{NEn}$ to process the received network layer packets and establish network layer packets to be transmitted. The manager $G_{NEn}$ also processes applications specific to the equipment node $NE_n$.

Alternatively, the node NI is cancelled and the interface $IC_{NEn}$ of the equipment node $NE_n$ is adapted to directly communicate with the access node NA of the access network RA.

The access node NA is considered as an access point, such as a base station, and includes a radio interface $IR_{NA}$ to communicate with the radio interface $IR_{NU}$ of the user node NU via the radio channels CRD, CRS and CRL.

The node NA also includes two packet-based communication interfaces $IC_{RT1}$ and $IC_{RT2}$ to transmit and receive network layer packets to and from respectively the packet-based communication interface $IC_{NC1}$ of the node NC1 and the packet-based communication interface $IC_{NI}$ of the node NI. The node NA further includes a manager $G_{NA}$ containing a detection unit UDRT, a network layer packet inspection unit UI, a network layer packet switching/routing unit UA/UR and a negotiation unit UN.

A detection unit UDRT detects a connection of a local transmission network such as the network RT2 upon installation thereof or the installation of the node NA. The UDRT unit establishes the local radio channel CRL between the radio interfaces $IR_{NA}$ and $IR_{NU}$ to transmit information IFRT2 concerning network RT2.

Alternatively, the unit UDRT uses the conventional signaling radio channel CRS to exchange signaling packets PRS containing information IFRT2 concerning network RT2.

According to another alternative, the detection function of the unit UDRT is fulfilled by the user node NU.

The inspection unit UI inspects and analyzes at least one part of each of the network layer packets PRD and PRS transmitted by the interfaces $IC_{NC1}$, $IC_{NI}$ and $IR_{NU}$ and received by the interfaces $IC_{RT1}$, $IC_{RT2}$ and $IR_{NA}$ in order to take a decision about the switching or the routing of each received packet according to the type of service referenced in the packet and/or the addressee concerned by the packet.

The switching/routing unit UA/UR switches or routes, according to embodiments of the invention, each of the inspected network layer packets towards one of the two transmission networks RT1 and RT2 or towards the user node NU.

The negotiation unit UN in the access node NA selects a data radio channel CRD already established or initiates a negotiation with the control node NC1 of the network RT1 to establish a data radio channel CRD, so that the user node NU accesses, via this selected or negotiated radio channel, to a service provided by an equipment node $NE_n$ of the local transmission network RT2.

Alternatively, the unit UN initiates a negotiation with the user node UN, via the access node NA, so that the user node establishes a data radio channel CRD and accesses, via such negotiated radio channel, to a service provided by an equipment node $NE_n$ of the local transmission network RT2.

According to a first embodiment of the invention, the access node NA does not possess any network layer. The inspection unit UI reads a part of the header fields of signaling packets PRS or data packets PRD intercepted by the node NA. The switching unit UA switches each inspected network layer packet to a node NC1 of the transmission network RT1 or a node $NE_n$ of the transmission network RT2 by modifying or not part of the header fields of the network layer packet.

According to a second embodiment of the invention, the access node NA possesses a network layer and an inspection unit UI inspects and analyzes then all the header fields of the network layer packet PRS or PRD. The routing unit UR generates a new network layer packet, the content of which is analogous or substantially analogous to the inspected network layer packet, but the format of which can be adapted to the destination transmission network of this packet.

The managing method for network layer packets in the node NA includes three steps as follows:
- a dialog step between the nodes NU, NA and $NE_n$ for establishing exchanges with the local transmission network RT2,
- a inspection step for network layer packets which can transit between, on one hand, the node NU and the node NC1 of the conventional transmission network RT1, and on the other hand, the node NU and the node $NE_n$ of the local transmission network RT2, via the node NA, and
- a switching/routing step for inspected network layer packets from the node NA to the nodes NU, NC1 and $NE_n$.

Figure 4:
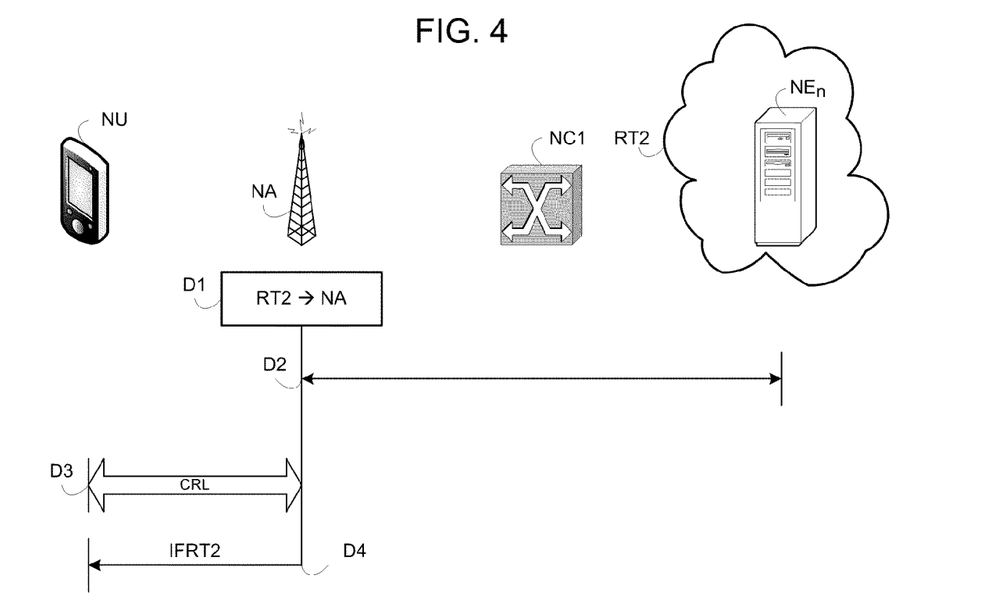
FIG. 4 is an algorithm of a dialog step for a network layer packet managing method according to the invention.

Referring to FIG. 4, the dialog step includes steps D1 to D4.

Upon the installation of the access node NA, for instance, by the operator of the transmission network RT1 or upon the installation of the local transmission network RT2 near the node NA, the detection unit UDRT of the node NA detects a connection for the local transmission network RT2 to the node NA, in step D1. Through a signaling exchange between the node NA and the equipment nodes $NE_1$ to $NE_N$ via, if necessary, the node NI of the local transmission network RT2, the detection unit UDRT of the node NA discovers the nodes $NE_1$ to $NE_N$ of the network RT2 and the different services provided by the nodes $NE_1$ to $NE_N$, in step D2.

In step D3, the detection unit UDRT controls the establishment of a signaling local radio channel CRL between the radio interface $IR_{NU}$ of the user node NU and the radio interface $IR_{NA}$ of the access node NA so that the access node NA transmits to the node NU the network layer information IFRT2 concerning the detected local transmission network RT2, in step D4. The local radio channel CRL is established as soon as the user node NU is put in operation and has been introduced itself from the conventional transmission network RT1. The control node NC1 of the transmission network RT1 ignores the local radio channel CRL.

Alternatively, the access node NA can also use the conventional signaling radio channel CRS to transmit the network layer information IFRT2 concerning the local network RT2 to the user node NU.

At each modification in the installation of the local transmission network RT2 by removal or addition of another equipment node or an equipment service, the UDRT service of the node NA detects the modification and instructs the node NU via the local radio channel CRL or the conventional signaling radio channel CRS.

Alternatively, the node NU includes a detection software module which detects the addition or removal of the nodes $NE_1$ to $NE_n$ of the local transmission network RT2 and the different associated services within the network RT2, in step D2.

According to the first embodiment of the invention concerning the node NA that does not possess any network layer, the network layer information IFRT2 is transmitted from the conventional transmission network RT1 to the access node NA. For instance, a router HGI represented partly by the node NC1 and partly by the node NI is controlled by the operator of the conventional transmission network RT1. The operator knows the installation of the different equipment nodes connected in the second transmission network RT2.

According to the second embodiment of the invention concerning the node NA which possesses a network layer, the network layer information IFRT2 are required by the node NA to the different equipment nodes of the network RT2 by diffusing towards the network RT2 an information request included in a network layer packet generated by the routing unit UR and transmitted via the communication interface $IC_{RT2}$.

Figure 5:
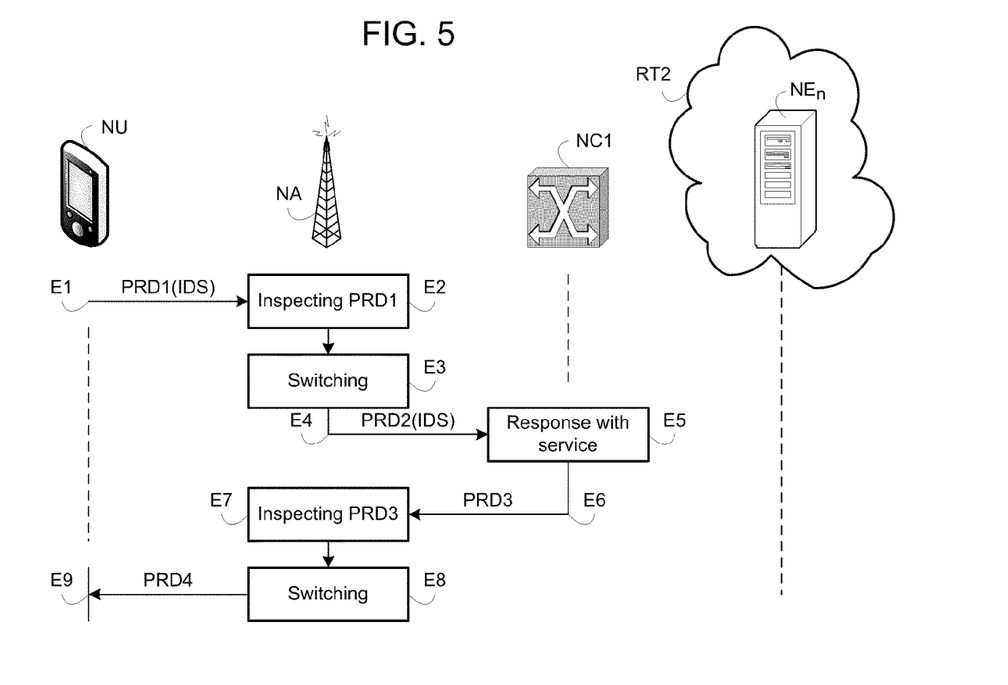
FIGS. 5 and 6 are algorithms representative of inspection and switching/routing steps of a network layer packet managing method according to two embodiments of the invention.
Figure 6:
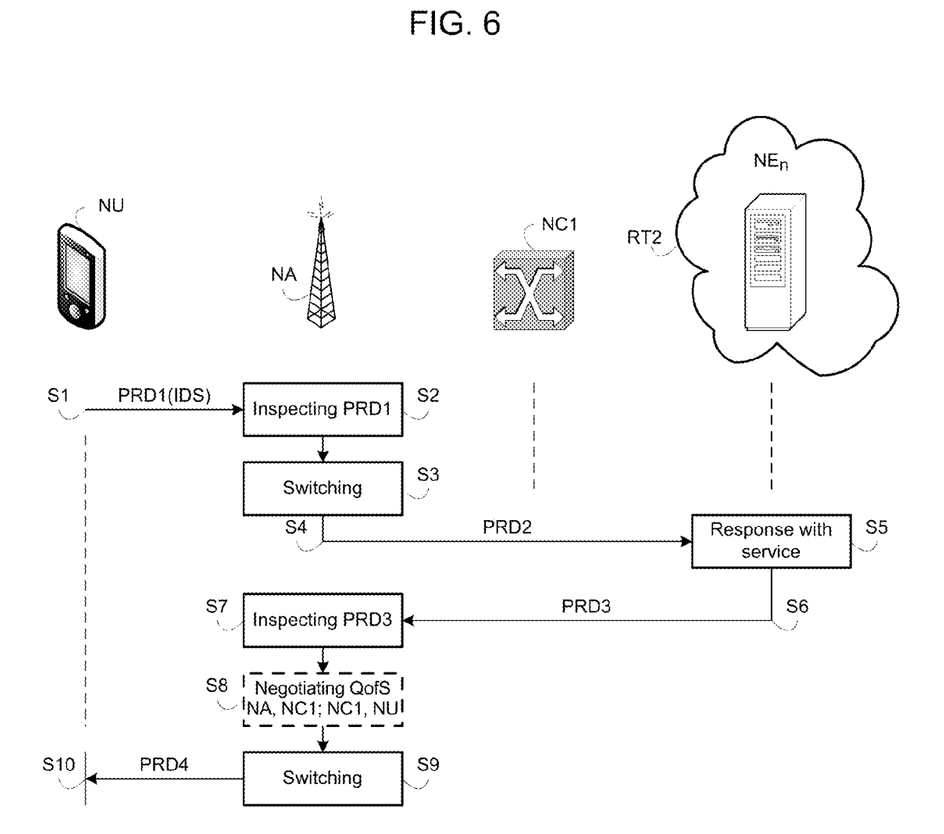

Referring to FIGS. 5 and 6, the inspection and switching/routing steps of the management method concerning a packet include steps E1 to E9 and S1 to S10 respectively according to the destination transmission network RT1 or RT2 for the packet.

At step E1-S1, the user node NU requires a service by transmitting a request included within a first network layer packet PRD1, the payload of which contains the identifier IDS of the requested service. The destination address ADD in the header of the network layer packet PRD1 corresponds to the address of a node of one of the two transmission networks RT1 and RT2.

Referring to step S1 on FIG. 6, the node NU requests a service dispensed by one of the equipment nodes of the network RT2 and chooses as for the destination address ADD the address, if necessary, of the intermediate node NI and the associated network mask. The address, if necessary, of the intermediate node and the network mask are previously contained in the information IFRT2 received at step D4. The network layer packet PRD1 including the service request is then diffused to all the equipment nodes having a network address beginning corresponding to the mask.

The network layer packet PRD1 is transmitted from the radio interface $IR_{NU}$ of the node NU to the radio interface $IR_{NA}$ of the node NA via one of the data radio channels CRD pre-established between the user node NU and the access node NA while attaching the node NU to the node NA and signaling such attachment at the control node NC1 of the conventional transmission network RT1.

At step E2-S2, the radio interface $IR_{NA}$ of the node NA receives the network layer packet PRD1 including the service request. The inspection unit UI inspects the received packet and extracts from it the source address ADS, the destination address ADD, the protocol identifier IDP and a reference to the service such as the service identifier IDS.

The inspection unit UI analyzes the recovered data and decides to select the transmission network to which the network layer packet has to be switched.

According to a first example, the switching of the packet is decided as a function of the destination address ADD corresponding to one or more nodes of one of the transmission networks RT1 and RT2.

According to another example, the switching is decided as a function of the type of requested service and to a switching condition. The service can be provided either by one of the transmission networks RT1 and RT2, or by the two networks. When the service is provided by only one of the two transmission networks of the node NA and which does not correspond to the destination address ADD, the switching/routing unit UA/UR modifies at step E3, S3 the destination address in the packet PRD1 to switch/route the packet PRD1 thus modified into a packet PRD2 to the transmission network providing the service. When the two transmission networks provide the same service, the switching/routing decision is established as a function of a switching/routing condition. For instance, the switching/routing condition refers to the service transmission cost: if the cost is lower via the local network RT2 than via the conventional network RT1, the modified packet is switched/routed towards the network RT2. In accordance with another example, the switching/routing condition relates to the transmission rate which is higher in the local network RT2 than in the conventional network RT1. The unit UA/UR modifies or not the destination address ADD of the network layer packet, at step E3, S3, to transmit the network layer packet PRD2 towards the transmission network respecting the switching/routing condition, at step E4, S4. If the address ADD of the packet PRD2 corresponds to an address of a node ND in the conventional transmission network RT1, the packet PRD2 is transmitted to the network RT1 at step E4. If the address ADD of the packet PRD2 corresponds to an address of the node $NE_n$ in the local transmission network RT2, the packet PRD2 is transmitted to the network RT2 at step S4.

At step E5, S5, the node ND or $NE_n$ dispensing the requested service looks for the service and transmits to the access node NA the response containing the service included in a network layer packet PRD3, at step E6, S6. After reception of the packet PRD3 by the communication interface $IR_{NA}$ of the node NA, the inspection unit UI inspects the packet PRD3 at step E7, S7 and the switching/routing unit UA/UR switches/routes the inspected packet designated by PRD4 to the user node NU at step E8, S9. The node NU receives then the packet PRD4 via one of the conventional data radio channels CRD, at step E9, S10.

According to the first embodiment of the invention concerning the node NA which does not possess any network layer, the inspection unit UI only inspects a part of the header fields in the network layer packet and a part of the payload field of the packet to obtain the source and destination addresses and a reference of the service such as the identifier IDS of this latter. The inspection UI and switching UA units access to and modify part of the header fields in the network layer packet, for instance by removing the linking layer header so as to obtain the network layer packet and modify, if necessary, the destination address ADD therein.

According to the second embodiment of the invention concerning the node NA possessing a network layer, the inspection unit UI inspects all the header fields in the network layer packet. The routing unit UR generates a new network layer packet containing the necessary data to route the packet towards the selected transmission network.

The method also includes a step S8 for selecting and/or negotiating the quality of service or the establishment of a data radio channel CRD in order to provide the local transmission network RT2 with a service quality negotiated with the conventional transmission network RT1 and to modify it if necessary.

When the user node NU is connected to the operator conventional transmission network RT1 to access to a first service, the access node NA allocates to the user node NU, being consistent with the control node NC1, one or more data radio channels CRD, whose quality or qualities of service correspond to the first service requested and dispensed by a node of network RT1 at steps E1 to E9. The quality of service corresponds for instance to criteria of an audio or video data transmission service.

Then, after a request by the user node NU of a second service provided by one of the network equipment nodes RT2 at steps S1 to S7, the access node NA decides to switch/route to a step S9 a network layer packet PRD4 in the local network RT2. If one of the data radio channels CRD already established but not allocated possesses a service quality partially meeting the service quality criteria of the second service, such data radio channel is selected at a step S8 preceding the step S9 by the negotiation unit UN of the node NA to transmit the second service. If the service qualities of the data radio channels already established do not correspond to the service quality criteria of the second service or if all the channels CRD are already allocated, the negotiation unit UN of the node NA initiates at step S8 a negotiation with the control node NC1 of the conventional network RT1 to establish a new data radio channel CRD, whose service of quality partially meets the service quality criteria of the second service coming from the local network RT2.

Alternatively and according to the second embodiment of the invention, the negotiation unit UN of the node NA establishes a request for the attention of the user node NU in order to initiate the negotiation for the establishment of a data radio channel CRD with the node NC1 from the node NU. The request is included in a network layer packet generated by the routing unit UR of the access node NA and is transmitted to the node NU via the conventional signaling radio channel CRS or via the local radio channel CRL from the radio interface $IR_{NA}$.

According to another alternative, the equipment node $NE_n$ of the network RT2 providing the second service includes a selection and negotiation unit to authorize the access node NA to select a data radio channel having a service quality corresponding to the service quality criteria of the second service, or to initiate a data radio channel establishment negotiation a via the node NA or the node NU with the node NC1.

An application of the invention relates to a transmission network of the HGI ("Home Gateway Initiative") type including an intermediate node $N_{HGI}$, a part of said node $N_{HGI}$ being dedicated to the transmission network access RT1 and corresponding to the node NC1, and the other part of the node $N_{HGI}$ being dedicated to the access of the transmission network RT2 and corresponding to the node NI.

In a multicast communication, the user node NU accesses via the node NC1 to multicast services provided by the transmission network RT1 or to multicast services provided by an equipment node $NE_n$ in the transmission network RT2.

The inspection unit UI for the access node NA decides of the switching of a multicast service request emitted by the node NU to the best adapted transmission network, as a function of the information contained in the network layer packet including the request, such as the identifier IDP of protocol which can be the protocol of the IGMP type and the service identifier IDF which is the multicast address of the requested service. In a first case, one of the two networks does not provide the requested multicast service, the node NA thus switching the network layer packet towards the other transmission network. According to a second case, the two networks offer the requested service, the node NA thus switching the network layer packet containing the service request to the local transmission network RT2 in order, for instance, to reduce the transmission load of the conventional transmission network RT1.

An example of unicast network communication relates to the downloading of music or video files from a node of one of the transmission networks RT1 and RT2 towards the user node NU.

According to another example, upon a communication in videoconference, the user node NU retransmits an audio and/or video signal via the access node NA to an equipment node $NE_n$, such as a digital television, in the local transmission network RT2, and conversely the equipment node $NE_n$ retransmits an audio and/or video signal via the access node NA to the user node NU.

The invention herein described relates to a method and a node of an access network in a telecommunications network for managing network layer packets. In an embodiment, the steps in the method of the invention are determined by instructions of a computer program incorporated into the node. The program includes program instructions which, when said program is executed in the processor of the node, whose operation is then controlled by executing the program, perform the steps in the method of the invention.

Consequently, the invention also applies to a computer program, including a computer program stored on or in a storage medium readable by a computer and any data processing device adapted to implement the invention. Such a program may be written in any programming language and take the form of source code, object code, or intermediate code between source code and object code, e.g. in a partially compiled form, or any other form suitable for implementing the method of the invention.

The storage medium may be any entity or device capable of storing the program. For example, the medium may include storage means on which the computer program of the invention is stored, such as a ROM, for example a CD-ROM or a microelectronic circuit ROM, or USB key, or magnetic storage means, for example a diskette (floppy disk) or hard disk.

Moreover, the information medium can be a transmissible medium such as an electrical or optical signal, which can be routed via an electrical or optical cable, by radio or by other means. The program according to the invention can in particular be downloaded over an Internet type network.

Alternatively, the storage medium may be an integrated circuit in which the program is incorporated, the circuit being adapted to execute or be used for the execution of the method embodying the invention.

The invention claimed is:

1. A method of managing a network layer packet in an access node, said access node arranged to communicate with a first transmission network, a second transmission network, and a user node, said user node having direct wireless access to said access point and having indirect access through said access point to said first transmission network and said second transmission network, said method including the following processes performed by the access node:
   inspecting at least one part of the network layer packet; and
   transmitting the inspected network layer packet to one of the following nodes responsive to a result of the inspection of the network layer packet: (1) a first node of the first transmission network by switching the inspected network layer packet directly to the first transmission network; (2) a second node of the second transmission network by switching the inspected network layer packet directly to the second transmission network; and (3) said user node via a radio channel;
   said method also comprising the following processes performed by the access node between performing said inspecting at least one part of said network layer packet and said switching whenever the network layer packet is relative to a service dispensed by an equipment node of said second transmission network:
   initiating a negotiation with a node of said first transmission network;
   establishing a data radio channel responsive to a result of said negotiation; and
   transmitting said network layer packet relative to the dispensed service from said access node to said user node through the established data radio channel.

2. The method according to claim 1, including, previously to inspecting at least one part of said network layer packet, detecting a connection of said access node to said second transmission network and transmitting the information relative to said second transmission network towards said user node.

3. The method according to claim 2, including transmitting said information relative to said second transmission network from said access node to said user node via a local radio channel unknown by said first transmission network and established by said access node.

4. The method according to claim 2, including transmitting said information relative to said second transmission network from said access node to said user node via a conventional local radio channel known by said first transmission network and established by said access node.

5. The method according to claim 1,
   wherein the negotiation initiated b said access node comprises the following processes before establishing a data radio channel:
   sending a request directly to the node of the first transmission network; and
   receiving a result of negotiation sent by said node of the first transmission network in response to the request.

6. The method according to claim 5, wherein negotiating between said access node and a node of said first transmission network depends on at least one service quality criterion relative to said service dispensed by said equipment node that said data radio channel to be established has to meet.

7. The method according to claim 1, wherein the negotiation initiated by said access node comprises the following processes before establishing a data radio channel:
   sending a first request for the attention of the user node in order to initiate the negotiation for the establishment of a data radio channel;
   transmitting a second request received from the user node to said node of the first transmission network; and receiving a result of negotiation sent by said node of the first transmission network in response to the request.

8. The method according to claim 1, said network layer packet being a packet relative to a service dispensed by an equipment node of said second transmission network, and between performing said inspecting at least one part of said network layer and said switching said network layer packet, said method further comprising:
selecting a data radio channel pre-established by said access node for a preceding communication between said user node and a node of one of said first transmission network and second transmission network; and
transmitting said network layer packet relative to said dispensed service from said access node to said user node through the selected data radio channel.

9. An access node for managing a network layer packet, said access node configured to communicate with a first transmission network, a second transmission network, and a user node, said user node having direct wireless access to said access point and having indirect access through said access point to said first transmission network and said second transmission network, and said access node including:
a radio interface configured to communicate directly with said user node;
a first interface configured to communicate directly with said first transmission network;
a second interface configured to communicate directly with said second transmission network;
an inspection unit configured to inspect at least one part of said network layer packet;
a negotiation unit configured to initiate a negotiation with a node of said first transmission network;
a switching/routing unit configured to transmit the inspected network layer packet to one of the following nodes responsive to a result of the inspection of the network layer packet performed by the inspection unit: (1) a first node of said first transmission network via the first interface; (2) a second node of the second transmission network via the second interface; and (3) said user node via the radio interface;
wherein the radio interface is configured to establish a data radio channel between said access node and said user node responsive to said negotiation; and
the switching/routing unit is configured to transmit a network layer packet relative to the service dispensed by an equipment node of said second transmission network, from said access node to said user node through the established data radio channel.

10. The access node according to claim 9, wherein the negotiation unit is configured to send a request directly to the node of the first transmission network and receive a result of negotiation sent by said node of the first transmission network in response to the request.

11. The access node according to claim 9, wherein the negotiation unit is configured to send a first request for the attention of the user node in order to initiate the negotiation for the establishment of a data radio channel, transmit a second request received from the user node to said node of the first transmission network and receive a result of negotiation sent by said node of the first transmission network in response to the request.

12. The access node according to claim 9, wherein the negotiation unit is configured to select a data radio channel pre-established by said access node for a preceding communication between said user node and a node of one of said first transmission network and second transmission networks,
wherein the switching/routing unit is configured to transmit a network layer packet relative to a service dispensed by an equipment node of said second transmission network, from said access node to said user node through the selected data radio channel.

13. A non-transitory storage medium readable by an access node for managing a network layer packet, said access node being adapted to communicate with a first transmission network, a second transmission network, and a user node, said user node having direct wireless access to said access point and having indirect access through said access point to said first transmission network and said second transmission network, said storage medium having stored a computer program including instructions to execute:
connecting said access node to said first transmission network and said second transmission network;
inspecting at least one part of said network layer packet; and
transmitting said inspected network layer packet to one of the following nodes responsive to a result of the inspection of the network layer packet: (1) a first node of said first transmission network by switching the inspected network layer packet directly to the first transmission network; (2) a second node of said second transmission network by switching the inspected network layer packet directly to the second transmission network; and (3) said user node via a data radio channel; and
performing the following processes between performing said inspecting at least one part of said network layer packet and said switching whenever the network layer packet is relative to a service dispensed by an equipment node of said second transmission network;
initiating a negotiation with a node of said first transmission network;
establishing a data radio channel responsive to a result of said negotiation; and transmitting said network layer packet relative to the dispensed service from said access node to said user node through the established data radio channel.

* * * * *

UNITED STATES PATENT AND TRADEMARK OFFICE
CERTIFICATE OF CORRECTION

| | |
|---|---|
| PATENT NO. | : 8,830,893 B2 |
| APPLICATION NO. | : 12/665109 |
| DATED | : September 9, 2014 |
| INVENTOR(S) | : Jerome Pons |

It is certified that error appears in the above-identified patent and that said Letters Patent is hereby corrected as shown below:

In the Claims

In column 12 line 48, In Claim 5, change "b" to --by--.

In column 14 line 45, In Claim 13, change "network;" to --network:--.

Signed and Sealed this
Thirty-first Day of March, 2015

Michelle K. Lee
*Director of the United States Patent and Trademark Office*